(12) United States Patent
Slama

(10) Patent No.: US 10,972,678 B2
(45) Date of Patent: Apr. 6, 2021

(54) IMAGE ACQUISITION DEVICE, DRIVER ASSISTANCE SYSTEM, AND METHOD FOR OPERATING AN IMAGE ACQUISITION DEVICE

(71) Applicant: MOTHERSON INNOVATIONS COMPANY LIMITED, London (GB)

(72) Inventor: Alexander Slama, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/542,791

(22) Filed: Aug. 16, 2019

(65) Prior Publication Data
US 2020/0059586 A1 Feb. 20, 2020

(30) Foreign Application Priority Data

Aug. 17, 2018 (DE) ...................... 10 2018 120 128.1

(51) Int. Cl.
| | | |
|---|---|---|
| *B60R 1/00* | (2006.01) | |
| *G02F 1/00* | (2006.01) | |
| *G02F 2/00* | (2006.01) | |
| *H04N 5/238* | (2006.01) | |
| *H04N 5/225* | (2006.01) | |

(Continued)

(52) U.S. Cl.
CPC ............. *H04N 5/238* (2013.01); *B60R 1/002* (2013.01); *H04N 5/2254* (2013.01); *H04N 5/2351* (2013.01); *B60R 2300/804* (2013.01); *B60R 2300/8093* (2013.01); *G02F 1/153* (2013.01)

(58) Field of Classification Search
CPC .... H04N 5/238; H04N 5/2351; H04N 5/2254; B60R 1/002; B60R 2300/8093; B60R 2300/804; G02F 1/153; G02F 1/01; G03B 11/00

See application file for complete search history.

(56) References Cited

U.S. PATENT DOCUMENTS 5,432,333 A * 7/1995 Rostoker ........... H01L 27/14645
250/208.1
5,648,655 A * 7/1997 Rostoker ........... H01L 27/14625
250/208.1

(Continued)

FOREIGN PATENT DOCUMENTS

CN 203450028 U 2/2014
DE 10 2016 012 341 A1 5/1917

(Continued)

OTHER PUBLICATIONS

Office action dated Dec. 10, 2018 of the German application No. 10 2018 120 128.1.

(Continued)

*Primary Examiner* — Philip P. Dang
(74) *Attorney, Agent, or Firm* — Jones Day

(57) ABSTRACT

An image acquisition device for a driver assistance system of a vehicle includes at least one light entry element and at least one image acquisition sensor. Image information in the form of light rays from the light entry element impinge on the image acquisition sensor along a ray path. The image acquisition device includes at least one darkening element having a variable translucency in at least a first frequency range.

13 Claims, 2 Drawing Sheets

(51) Int. Cl.
*H04N 5/235* (2006.01)
*G02F 1/153* (2006.01)

(56) References Cited

U.S. PATENT DOCUMENTS

| | | | | |
|---|---|---|---|---|
| 5,959,731 A * | 9/1999 | Jones | ............ | G01B 11/06 |
| | | | | 356/503 |
| 5,982,478 A * | 11/1999 | Ainsworth | ............ | G01P 5/001 |
| | | | | 356/28 |
| 6,710,799 B2 * | 3/2004 | Abnet | ............ | G01B 9/04 |
| | | | | 348/135 |
| 6,980,092 B2 * | 12/2005 | Turnbull | ............ | B60R 1/12 |
| | | | | 307/10.1 |
| 7,023,379 B2 * | 4/2006 | Turnbull | ............ | G01S 5/0221 |
| | | | | 342/357.75 |
| 7,671,919 B2 * | 3/2010 | Iwasaki | ............ | H04N 5/2254 |
| | | | | 348/373 |
| 7,983,817 B2 * | 7/2011 | Breed | ............ | B60N 2/0232 |
| | | | | 701/45 |
| 8,293,455 B2 * | 10/2012 | Arthur | ............ | C23C 18/1653 |
| | | | | 430/311 |
| 8,760,756 B2 * | 6/2014 | Price | ............ | G02B 21/244 |
| | | | | 359/368 |
| 9,063,332 B2 * | 6/2015 | Kim | ............ | G02B 26/0841 |
| 9,392,231 B2 * | 7/2016 | Kanamori | ............ | H04N 5/2254 |
| 9,871,971 B2 * | 1/2018 | Wang | ............ | H04N 7/18 |
| 9,915,919 B2 * | 3/2018 | Sanchez Ortiga | ..... | G02B 21/36 |
| 10,005,229 B2 * | 6/2018 | Mantell | ............ | B29C 64/112 |
| 10,203,699 B1 * | 2/2019 | Kim | ............ | G08G 1/0116 |
| 10,277,825 B2 * | 4/2019 | Wang | ............ | H04N 7/183 |
| 10,286,843 B2 * | 5/2019 | Gieseke | ............ | G06K 9/00845 |
| 10,419,655 B2 * | 9/2019 | Sivan | ............ | G06F 3/013 |
| 10,706,621 B2 * | 7/2020 | von Cramon | ............ | H04N 5/232 |
| 2006/0208169 A1 * | 9/2006 | Breed | ............ | G06K 9/00624 |
| | | | | 250/221 |
| 2014/0333806 A1 | 11/2014 | Ehlgen | | |
| 2016/0137126 A1 * | 5/2016 | Fursich | ............ | H04N 5/23238 |
| | | | | 348/38 |
| 2016/0269603 A1 | 9/2016 | Watanabe | | |
| 2017/0363897 A1 * | 12/2017 | Martin | ............ | G06K 9/00771 |
| 2019/0154439 A1 * | 5/2019 | Binder | ............ | G01S 15/08 |

FOREIGN PATENT DOCUMENTS

| | | |
|---|---|---|
| DE | 10 2004 061 334 A1 | 7/2006 |
| DE | 10 2014 006 340 A1 | 11/2015 |
| DE | 102014006340 A1 | 11/2015 |
| EP | 2560364 A1 | 2/2013 |
| JP | H0951484 A | 2/1997 |
| JP | 2003008952 A | 1/2003 |

OTHER PUBLICATIONS

Great Britain Office Action dated Dec. 18, 2020 of application No. GB 1911640.9.

* cited by examiner

IMAGE ACQUISITION DEVICE, DRIVER ASSISTANCE SYSTEM, AND METHOD FOR OPERATING AN IMAGE ACQUISITION DEVICE

CROSS-REFERENCE TO RELATED APPLICATION

This application claims the benefit of foreign priority to German Patent Application No. 10 2018 120 128.1, filed Aug. 17, 2018, which is hereby incorporated by reference in its entirety for all purposes.

BACKGROUND

1. Field of the Invention

The present disclosure relates to an image acquisition device for a driver assistance system of a vehicle.

2. Related Art

Image acquisition devices of the kind mentioned above are used in diverse ways in modern vehicles, in particular semi-autonomous and autonomous driving vehicles. The image acquisition devices are part of driver assistance systems, for example, camera monitor systems, also called mirror replacement systems or rear view devices, or surround view systems.

These driver assistance systems serve to display an image acquired by means of the image acquisition device to a passenger of the vehicle via a display device. Beyond this, however, such image acquisition devices are also used in driver assistance systems in which the data acquired by means of the image acquisition device are processed without being displayed to a passenger and further vehicle systems are controlled or influenced by these data. Driver assistance systems of this type are, for example, lane keeping systems, traffic sign recognition assistants, lane-changing assistants or blind spot monitoring devices.

In order for these driver assistance systems to function accurately, it is essential that the data supplied by the image acquisition device can be processed without gaps.

However, a problem is posed by ambient light, such as direct sunlight or low beams from approaching vehicles, impinging directly on the image acquisition device. The image information supplied by the image acquisition device is affected by these external influences such that structures or elements in the surroundings of the incident light can no longer be satisfactorily imaged, or the data supplied by the image acquisition device are not of a sufficient quality to be reliably processed by the driver assistance system.

According to various aspects and in one example, image acquisition devices are provided which can supply image data of sufficient quality regardless of whether or not additional ambient light such as sunlight or low beams of other vehicles or reflections thereof impinges on the image acquisition device.

SUMMARY

In an aspect, an image acquisition device includes at least one light entry element and at least one image acquisition sensor where image information in the form of light rays from the light entry element impinge on the image acquisition sensor along a ray path, and the image acquisition device includes at least one darkening element having a variable translucency in at least a first frequency range.

The darkening element may be configured at least in areas in the form of at least one darkening matrix, may be arranged on the side of the light entry element remote of the image acquisition sensor, may be part of, at least in areas, the light entry element, may be arranged across the ray path, and/or may be part of, at least in areas, the image acquisition sensor.

In the two embodiment forms mentioned above, the darkening element may include smart glass, electrochromic glass, thermochromic glass, liquid crystal glass, polymer dispersed liquid crystal glass, electrowetting system and/or at least one darkenable coating and/or foil.

An image acquisition device may include at least one sensor element for sensing at least one light parameter of light impinging on the image acquisition device, in particular the light entry element, the image acquisition sensor and/or the darkening element, in particular a light intensity, in particular a light intensity within a second frequency range preferably corresponding at least in areas to the first frequency range, a brightness, a polarization and/or a predetermined coverage of at least one matrix, where in particular the parameter is detectable by means of the sensor element so as to be spatially resolved and/or directionally resolved in one dimension, two dimensions and/or three dimensions.

The sensor element may be, at least in areas, part of the image acquisition sensor, formed by the image acquisition sensor, formed by at least one further image acquisition sensor, at least in areas part of an ambient light sensor which is part of the driver assistance system and/or formed by the ambient light sensor.

An image acquisition device can also be characterized by at least one control device, which control device is in operative communication with the image acquisition sensor, the light entry element, the darkening element, a display device for displaying images acquired by means of the image acquisition device, and/or with the sensor element.

It is also preferred that the darkening element and/or the control device are or is set up to change the translucency of the darkening element, in particular of at least a first subarea, at least in areas depending on the light parameter, in particular at least the first subarea is definable by means of the control device, preferably using static, in particular geometric, data of the vehicle and/or of the image acquisition device such as the yaw angle and/or pitch angle.

The translucency of the darkening element, in particular in the first subarea, may be changeable so that the amount of light impinging on the image acquisition sensor, in particular on a second subarea of the image acquisition sensor, remains below a first threshold value, and the first threshold value is preferably dependent on at least one overload limit of the image acquisition sensor, in particular in the second subarea, on at least one dazzle value of the image acquisition device and/or partial light incidences on the image acquisition sensor.

The light entry element may include at least one diaphragm, at least one lens, at least one objective lens, at least one protective glass, at least one filter element, preferably for filtering light in at least a third frequency range preferably corresponding at least in areas to the first frequency range and/or to the second frequency range, and/or at least one coating, in particular antireflection coating, and/or a higher scratch resistance, a higher fracture resistance, hydrophobic properties, hydrophilic properties, lotus effect properties and/or wind noise-minimizing properties such as shape, surface and/or contour.

An image acquisition device may include a plurality of darkening elements is provided, in particular different first frequency ranges, at least in areas, different first subareas, at least in areas, and/or different second subareas, at least in areas, can be influenced and/or changed using different darkening elements.

In another aspect, a driver assistance system includes at least one image acquisition device.

The driver assistance system may include and/or form, at least in areas, at least one rear view device, at least one lane keeping assistant, at least one traffic sign recognition assistant, at least one lane changing assistant, at least one blind spot monitoring device, at least one emergency braking system, at least one distance warning system, at least one collision avoidance system, at least one attention monitoring assistant, at least one driver attention monitoring system, at least one parking assistant, at least one surroundings monitoring system, at least one surround view system, turning assistance system, object recognition system, in particular pedestrian recognition system, protection recognition system and/or object classifying system.

In another aspect, a method for the operation of an image acquisition device of a driver assistance system, in particular of an image acquisition device and/or of a driver assistance system, where the image acquisition device further includes at least one image acquisition sensor and at least one darkening element which is arranged in front of the image acquisition sensor relative to a propagation path of light which contains the image information and impinges on the image acquisition sensor, and where the translucency of the darkening element is changed in at least a first frequency range depending on a parameter of the light impinging on the image acquisition device.

A brightness, a light intensity, an incidence angle and/or a glare angle of the light, in particular in a second frequency range preferably corresponding at least in areas to the first frequency range, may be used as parameters.

The translucency of the darkening element may be changed in at least a first subarea, preferably exclusively in the first subarea.

The translucency may be changed depending on the parameter of the light impinging on a second subarea of the image acquisition sensor, in particular on an exceeding of a threshold value such as an overload limit and/or a dazzle value.

The first subarea may be determined depending on the position of the second subarea on the image acquisition sensor, in particular through projection of the second subarea on the darkening element.

The image acquisition device of a driver assistance system, in particular the quality of the data supplied by the image acquisition device for display or further processing, may be improved in that the effects of glare produced by ambient light such as direct sunlight or low beams can be prevented. A problem-free further processing is enabled in that dazzle is avoided within the image acquired by the image acquisition device. Accordingly, dazzle within the image is the reason that a problem-free further processing of the data supplied by the image acquisition device is not always possible; in particular, as a result of the corresponding dazzle, a resolution of contours and elements located in the area of the dazzle is no longer possible. Further, the use of a variable darkening element makes it possible to provide high-quality image data over the entire required area, in particular also in situations in which external light irradiation comes about, but also in night light situations or twilight situations and in shadowed or low-contrast areas of the image outside of the dazzle.

The translucency between light source and image acquisition device, in particular the image acquisition sensor of the image acquisition device, may be changeable using the darkening element such that a darkening or shading of the light impinging on the image acquisition sensor can be achieved. The darkening is preferably carried out only partially in the area in which dazzle comes about, that is, in particular, a masking is carried out.

The darkening element may include one or more electrochromic or thermochromic composite glasses. The darkening element can be arranged in the light path in front of the image acquisition device, in particular a light entry element of the image acquisition device. Also, there can be provided a front glass or protective glass in which the darkening element is integrated. Preferably, the front glass or protective glass further has certain properties, for example, scratch resistance and/or fracture resistance, such as are achieved, for example, by gorilla glass. Infrared filters and/or color filters, reflection coatings and hydrophobic coatings or hydrophilic coatings can also be integrated in the light entry element or front glass or protective glass.

The darkening element can also be located in an area between the protective glass, light entry element and image acquisition sensor, for example, in front of, behind, or inside of a lens system of the image acquisition device. It is also conceivable that the darkening element is arranged on the image acquisition sensor or integrated therein.

In particular through the use of electrochromic composite glasses of the darkening element, the darkening element can have a plane or curved surface and accordingly can itself serve as additional optical element.

The actuation of the darkening element, in particular the change in the (partial) translucency of the darkening element, in particular EC glasses, is carried out by at least one light-sensitive sensor element. The sensor element can be formed at least partially by the image acquisition sensor, can include a further image acquisition sensor or can be a sensor for measuring ambient light.

A sensor element can be used which already exists in the driver assistance system, for example, the image acquisition sensor of the image acquisition device or an ambient light sensor, by means of which, for example, an automatic low beam can be controlled.

The data supplied by the light-sensitive sensor may be transferred to a control device or to one or more electronics modules which convert the sensor data into corresponding values, and the translucency of the darkening element is controlled by corresponding actuation of the darkening element.

The data supplied by the sensor element and/or the data supplied to the darkening element may be transferred to an image processing chain such as an image signal processor which thereupon can control further parameters of the image acquisition device and/or can adapt and/or modify image processing software or an image processing program.

A translucency can be changed by means of the darkening device over the entire image section acquired by the image acquisition device. In another example, preferred embodiment forms, however, it is also possible to partially control the translucency of the darkening element. Accordingly, corresponding algorithms carried out in the control device make it possible to achieve a controlling of only a subarea of the darkening element, in particular to darken only those areas of an external light source which result in dazzle in at least one subarea of the image acquisition sensor. In this way, a partial masking of the image acquisition sensor is accordingly achieved.

Further parameters of the light impinging on the image acquisition device can also be sensed by means of the sensor element, and the darkening element can be controlled depending on these further parameters. For example, a frequency analysis of the light impinging on the image acquisition device, in particular image acquisition sensor, can be performed and only a partial darkening of the darkening element can be carried out for predetermined frequency ranges.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein.

DETAILED DESCRIPTION

Figure 1:
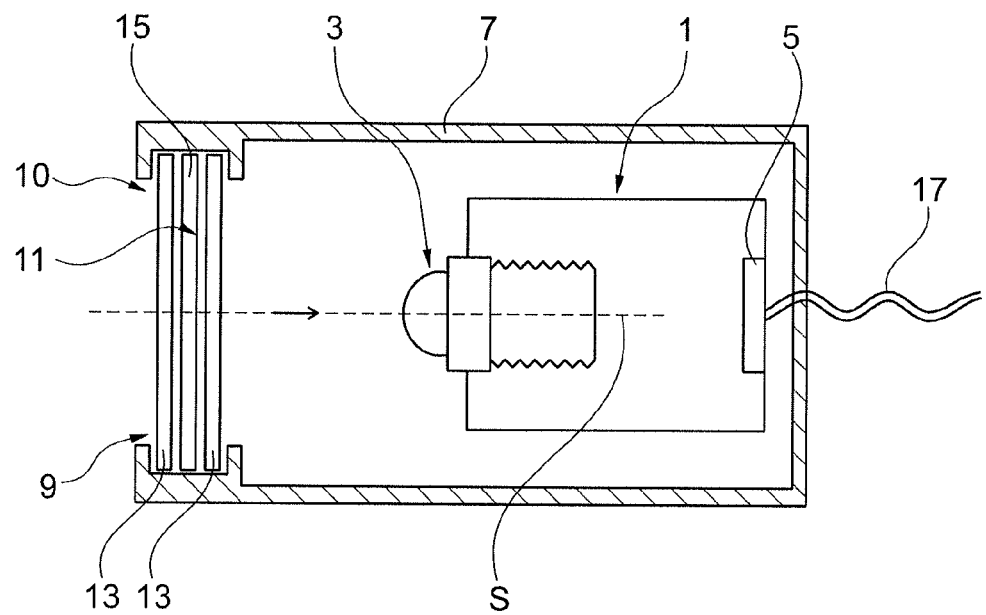
FIG. 1 shows a schematic cross-sectional view of a first embodiment form of an image acquisition device.

It is to be understood that the disclosure is not limited in its application to the details of construction and to the arrangements of the components set forth in the following description or illustrated in the drawings. The figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding. Those skilled in the art will also appreciate that the development of an actual commercial embodiment incorporating aspects of the present disclosure may require numerous implementation-specific decisions to achieve the developer's ultimate goal for the commercial embodiment.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the figures and are not intended to limit the scope of the present disclosure. Further, it should be understood that any one of the features may be used separately or in combination with other features. Other systems, methods, features, and advantages will be or become apparent to those skilled in the art upon examination of the figures and the description. It is intended that all such additional systems, methods, features, and advantages be included within this description, and be within the scope of the present disclosure.

According to FIG. 1, an image acquisition device 1 includes a light entry element in the form of a lens system 3 and an image acquisition sensor 5.

Image acquisition device 1 is arranged inside of a housing 7, and light is incident into the housing 7 along a beam path S through an aperture 9. It is provided that a protective glass 10 including a darkening element 11 is arranged in aperture 9. Darkening element 11 includes in particular an electrochromic glass (EC glass). To this end, an electrolytic layer 15 is arranged between glass elements 13. The translucency of darkening element 11 can be changed by applying a voltage to the electrolytic layer 15.

It is provided that the image acquisition sensor 5 is connected to a control device, not shown, by means of a line 17. Further, the control device is connected to darkening element 11 via a connection, not shown.

Depending on the data supplied by means of the image acquisition sensor 5, darkening element 11 is controlled such that, in case an overloading of at least one subarea of image acquisition sensor 5 is detected as the result of dazzle, darkening element 11 is changed such that its translucency is reduced until the amount of light or brightness impinging on image acquisition sensor 5 is reduced such that the image data values are reduced below the threshold value or dazzle value.

In this way, the data supplied by image acquisition sensor 5 can readily be routed to a display device, not shown, inside of the vehicle, and it is also possible for contours or elements located in the area of the external light incidence to be recognized and identified beyond doubt by the driver on the display device.

Figure 2:
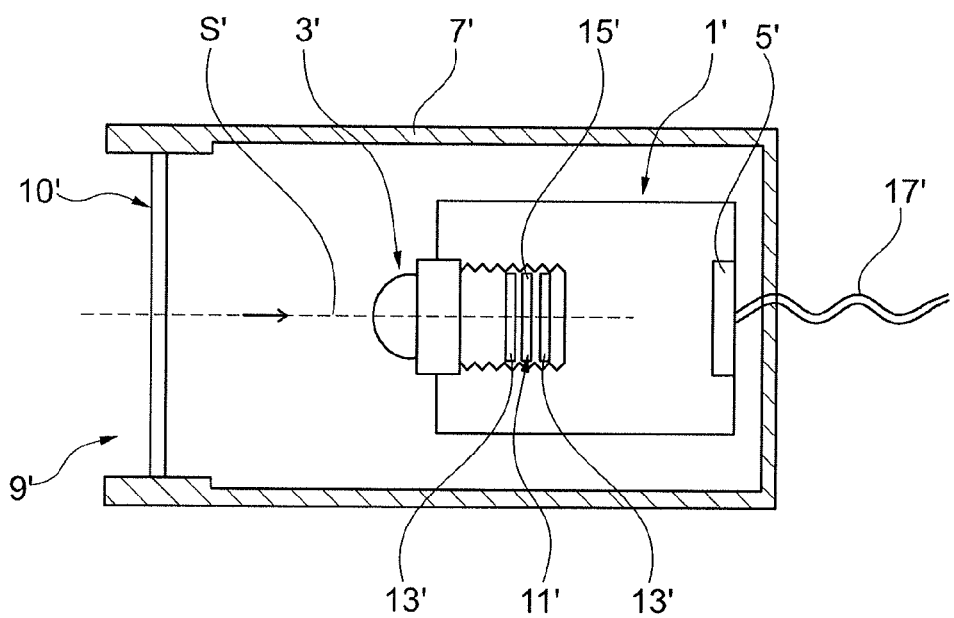
FIG. 2 shows a schematic cross-sectional view of a second embodiment form of an image acquisition device.

An alternative embodiment form of an image acquisition device 1' is shown in FIG. 2. The elements of image acquisition device 1' corresponding to those of image acquisition device 1 are denoted by like reference numerals but with the addition of a single prime symbol.

In contrast to image acquisition device 1, the darkening element 11' in image acquisition device 1' is not integrated in the protective glass 10' but in the light entry element in the form of lens system 3'. In this regard, the darkening element 11' can realize other optical characteristics in addition to adjustability of translucency such as a lens function. As has already been stated, darkening element 11' is controlled via a control device, not shown, depending on the data supplied by means of image acquisition sensor 5'.

Figure 3:
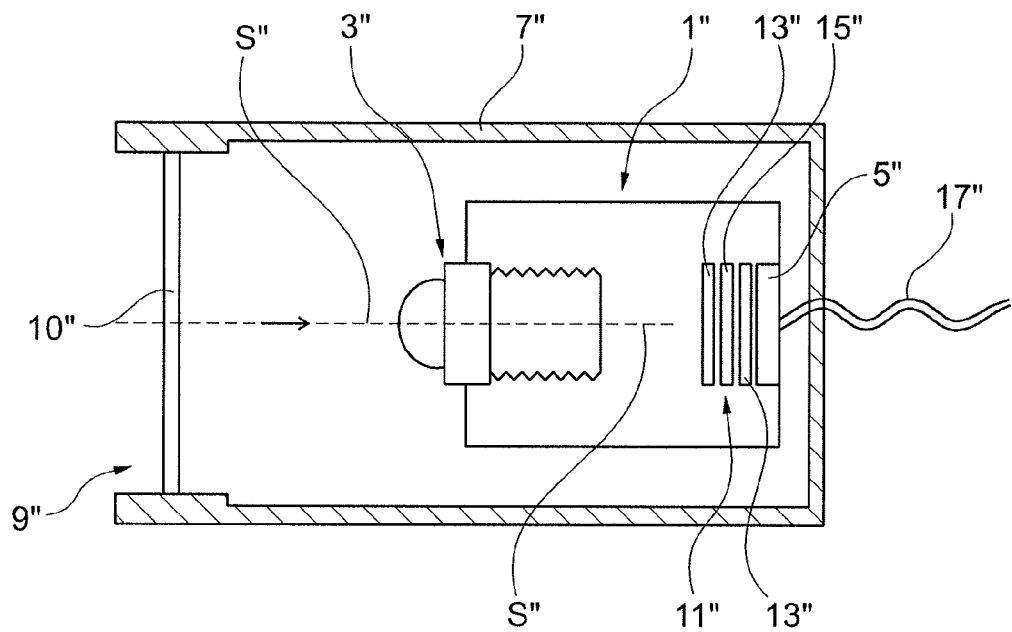
FIG. 3 shows a schematic cross-sectional view of a third embodiment form of an image acquisition device.

FIG. 3 shows a third embodiment form of an image acquisition device 1". The elements of image acquisition device 1" corresponding to those of image acquisition device 1 are denoted by like reference numerals but with the addition of a double prime symbol.

In contrast to image acquisition devices 1, 1' shown in FIGS. 1 and 2, the darkening element 11" in image acquisition device 1" is arranged directly in front of the image acquisition sensor 5", in particular is integrated in image acquisition sensor 5".

In embodiment forms that are not shown, it is in particular preferred that a plurality of darkening elements is used, in particular a combination of darkening elements 11, 11', 11". This affords the advantage that different darkening elements can be used, and the translucency can accordingly be changed in different frequency ranges. In this way, a filter function can also be achieved simultaneously by the darkening elements, and the color composition of the light impinging on the image acquisition sensor can be changed so that an increased contrast can be achieved within the image and by the data supplied by the image acquisition sensor.

In embodiment forms that are not shown, it can also be provided that the values supplied to the control device can be provided by another sensor element in addition to image acquisition sensor. For example, a further image acquisition sensor or a sensor for sensing ambient light can be used. In so doing, such sensor elements can supply values to the control device as an alternative to or in addition to image acquisition sensor 5, 5', 5".

Darkening elements which make it possible to change only partial frequency ranges or geometric subareas thereof with respect to translucency can also be used.

Figure 4:
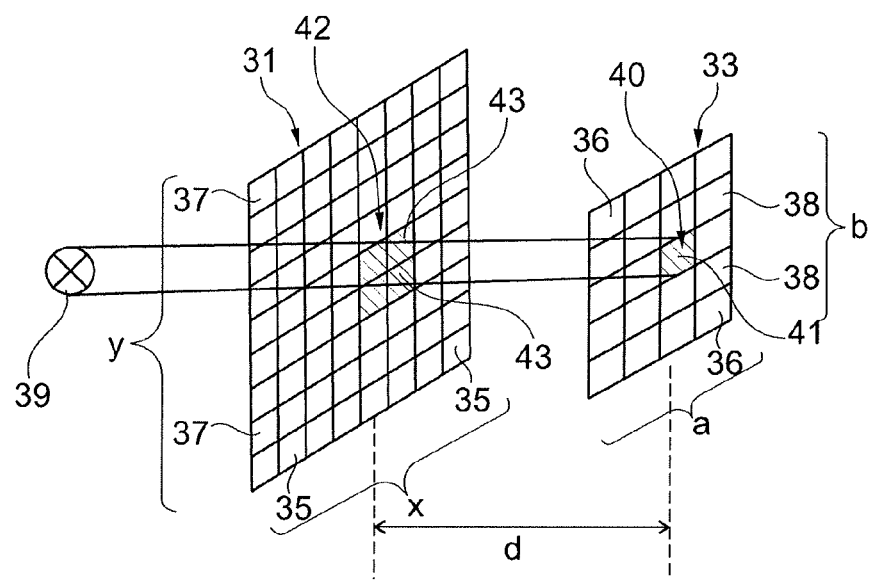
FIG. 4 shows a schematic diagram illustrating a partial masking through the darkening element.

An image acquisition device of this kind in particular includes a darkening element 31, shown schematically in FIG. 4, and an image acquisition sensor 33.

As will be appreciated in particular from FIG. 4, darkening element 31 can include a matrix with x columns 35 and y rows 37. In this regard, it is possible to separately control the individual fields defined by the respective column 35 and the respective row 37, i.e., to change a translucency for the latter independent from the other fields.

Accordingly, darkening element 31 includes a plurality of individual darkening elements, in particular electrochromic elements.

Image acquisition sensor 33 is arranged in the gap d relative to darkening element 31. In conventional manner, image acquisition sensor 33 includes a plurality of image points $B_S(a/b)$ which are arranged in a-columns 36 and b-rows 38. For example, if dazzle is generated by light source 39 in the second subarea 40 in the form of image point 41, the cells 43 can define a first subarea 42 through projection of this image point 41 or second subarea 40 on the plane of darkening element 31.

The translucency can then be reduced in cells 43 or in first subarea 42 by a selective control of darkening element 31, and the light intensity impinging on image point 41 or second subarea 40 can accordingly be reduced such that the light intensity drops below a threshold value.

The darkening of cells 43 is a function which depends upon the brightness value of the image point 41. Owing to the projection and the gap d between darkening element 31 and image acquisition sensor 33 taking into account further optically active elements, for example lenses, a corresponding number of cells 43 are activated in order to effectively cover or mask the light source for image acquisition sensor 33.

The fact that the element 39 generating dazzle has a coordinate defined by the coordinate system of the vehicle or of the image acquisition device is made use of for this purpose. The light emitted by element 39 such as low beams is initially projected onto darkening element 31, such as EC glass, and through darkening element 31 onto image acquisition sensor 33. The area to be darkened on the darkening element is calculated by means of a control device, not shown in FIG. 4, based on the static, in particular geometric, data known for the vehicle or image acquisition device such as the position at the vehicle and light acquisition direction as well as the orientation of the image acquisition device such as yaw angle and pitch angle. The values calculated by the control device, in particular comprising a computer unit by means of which a predetermined algorithm is executed, are then supplied to darkening element 31 so that the latter darkens in the required form at least an area calculated by means of the control device in the required manner, in particular intensity.

It should be understood that as used in the description herein and throughout the claims that follow, the meaning of "a," "an," and "the" includes the plural reference unless the context clearly dictates otherwise. Also, as used in the description herein and throughout the claims that follow, the meaning of "in" includes "on" unless that context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate a situation where only the disjunctive meaning may apply.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

LIST OF REFERENCE NUMERALS 1, 1', 1" image acquisition device
3, 3', 3" lens system
5, 5', 5" image acquisition sensor
7, 7', 7" housing
9, 9', 9" aperture
10, 10', 10" protective glass
11, 11', 11" darkening element
13, 13', 13" glass
15, 15', 15" electrolytic layer
17, 17', 17" line
31 darkening element
33 image acquisition sensor
35 column
36 column
37 row
38 row
39 light source
40 subarea
41 image point
42 subarea
43 cells
S, S', S" ray path

What is claimed is:

1. An image acquisition device for a driver assistance system of a vehicle, comprising
at least one light entry element for generating image information;
at least one image acquisition sensor with at least one darkening element having a variable translucency in at least a first light frequency range; and
at least one control device, wherein the control device is in operative communication with at least one of the image acquisition sensor, the light entry element, the darkening element, a display device for displaying images acquired using the image acquisition device, and a sensor element, wherein image information including light rays from the light entry element impinge on the image acquisition sensor along a ray path, wherein a plurality of darkening elements is provided, and the variable translucency is changeable at least in areas for different first light frequency ranges using different darkening elements, wherein at least one of the darkening element and the control device are or is set up to change the variable translucency of the darkening element and of at least a first subarea, depending on at least one light parameter, and at least the first subarea is definable using the control device, using static geometric data of the vehicle or of the image acquisition device including at least one of a yaw angle and a pitch angle, wherein the variable translucency of the darkening element and the first subarea is changeable so that an amount of light impinging on the image acquisition sensor and on a second subarea of the image acquisition sensor remains below a first threshold value, wherein the first threshold value is dependent on at least one overload limit of the image acquisition sensor in the second subarea on at least one dazzle value of the image acquisition device or partial light incidences on the image acquisition sensor, and wherein the darkening element includes a matrix with columns and rows, the area to be darkened on the darkening element is calculated by the control device based on a position of the vehicle, a light acquisition direction, and a yaw and pitch angle of the image acquisition device.

2. The image acquisition device according to claim 1, wherein the darkening element is configured at least in areas to at least one of form at least one darkening matrix,
be arranged on a side of the light entry element remote of the image acquisition sensor,
be comprised at least in areas by the light entry element,
be arranged across the ray path, and
be comprised at least in areas by the image acquisition sensor.

3. The image acquisition device according to claim 1, wherein the darkening element comprises at least one of smart glass, electrochromic glass, thermochromic glass, liquid crystal glass, polymer dispersed liquid crystal glass, electrowetting system, darkenable coating, and foil.

4. The image acquisition device according to claim 1, wherein the image acquisition device comprises at least one sensor element for sensing at least one light parameter of light impinging on the light entry element, the image acquisition sensor, or the darkening element, wherein the light parameter is a light intensity or a light intensity within a second frequency range corresponding at least in some areas to the first frequency range, a brightness, a polarization or a predetermined coverage of at least one matrix, and wherein the light parameter is detectable using the sensor element so as to be spatially resolved and/or directionally resolved in one dimension, two dimensions, or three dimensions.

5. The image acquisition device according to claim 4, wherein the sensor element is at least in areas comprised by the image acquisition sensor, formed by the image acquisition sensor, formed by at least one further image acquisition sensor, at least in areas comprised by an ambient light sensor comprised by the driver assistance system, or formed by the ambient light sensor.

6. The image acquisition device according to claim 1, wherein the light entry element comprises at least one diaphragm, at least one lens, at least one objective lens, at least one protective glass, at least one filter element for filtering light in at least a third frequency range corresponding at least in areas to the first frequency range or to the second frequency range, or at least one antireflection coating, or a higher scratch resistance, a higher fracture resistance, hydrophobic properties, hydrophilic properties, lotus effect properties or wind noise-minimizing properties such as shape, surface or contour.

7. The image acquisition device according to claim 1, where different first subareas, at least in some areas, or different second subareas, at least in some areas, are configured to be at least one of influenced and changed using the plurality of darkening elements.

8. A driver assistance system comprising at least one image acquisition device, the image acquisition device comprising:

at least one light entry element for generating image information;

at least one image acquisition sensor with at least one darkening element having a variable translucency in at least a first light frequency range; and at least one control device, wherein the control device is in operative communication with at least one of the image acquisition sensor, the light entry element, the darkening element, a display device for displaying images acquired using the image acquisition device, and a sensor element, wherein image information including light rays from the light entry element impinge on the image acquisition sensor along a ray path, wherein a plurality of darkening elements is provided, and the variable translucency is changeable at least in areas for different first light frequency ranges using different darkening elements, wherein at least one of the darkening element and the control device are or is set up to change the variable translucency of the darkening element and of at least a first subarea, depending on at least one light parameter, and at least the first subarea is definable using the control device, using static geometric data of the vehicle or of the image acquisition device including at least one of a yaw angle and a pitch angle, wherein the variable translucency of the darkening element and the first subarea is changeable so that an amount of light impinging on the image acquisition sensor and on a second subarea of the image acquisition sensor remains below a first threshold value, wherein the first threshold value is dependent on at least one overload limit of the image acquisition sensor in the second subarea on at least one dazzle value of the image acquisition device or partial light incidences on the image acquisition sensor, and wherein the darkening element includes a matrix with columns and rows, the area to be darkened on the darkening element is calculated by the control device based on a position of the vehicle, a light acquisition direction, and a yaw and pitch angle of the image acquisition device.

9. The driver assistance system according to claim 8, further comprising at least one of:

a rear view device;
a lane keeping assistant;
a traffic sign recognition assistant;
a lane changing assistant;

a blind spot monitoring device;
an emergency braking system;
a distance warning system;
a collision avoidance system;
an attention monitoring assistant;
a driver attention monitoring system, at least one parking assistant;
a surroundings monitoring system;
a surround view system;
a turning assistance system;
an object recognition system;
a pedestrian recognition system;
a protection recognition system; and
an object classifying system.

10. A method for operation of an image acquisition device, comprising:
providing the image acquisition device,
comprising at least one light entry element for generating image information;
at least one image acquisition sensor with at least one darkening element having a variable translucency in at least a first light frequency range; and
at least one control device, wherein the control device is in operative communication with at least one of the image acquisition sensor, the light entry element, the darkening element, a display device for displaying images acquired using the image acquisition device, and a sensor element,
wherein image information including light rays from the light entry element impinge on the image acquisition sensor along a ray path,
wherein a plurality of darkening elements is provided, and the variable translucency is changeable at least in areas for different first light frequency ranges using different darkening elements,
wherein at least one of the darkening element and the control device are or is set up to change the variable translucency of the darkening element and of at least a first subarea, depending on at least one light parameter, and at least the first subarea is definable using the control device, using static geometric data of the vehicle or of the image acquisition device including at least one of a yaw angle and a pitch angle,
wherein the variable translucency of the darkening element and the first subarea is changeable so that an amount of light impinging on the image acquisition sensor and on a second subarea of the image acquisition sensor remains below a first threshold value,
wherein the first threshold value is dependent on at least one overload limit of the image acquisition sensor in the second subarea on at least one dazzle value of the image acquisition device or partial light incidences on the image acquisition sensor, and
wherein the darkening element includes a matrix with columns and rows, the area to be darkened on the darkening element is calculated by the control device based on a position of the vehicle, a light acquisition direction, and a yaw and pitch angle of the image acquisition device.

11. The method according to claim 10, wherein a brightness, a light intensity, an incidence angle or a glare angle of the light in a second frequency range corresponding at least in areas to the first frequency range is used as a parameter.

12. The method according to claim 10, wherein the variable translucency of the darkening element is changed in at least a first subarea and exclusively in the first subarea.

13. The method according to claim 10, wherein the first subarea is determined depending on a position of the second subarea on the image acquisition sensor through projection of the second subarea on the darkening element.

* * * * *